United States Patent [19]

Hammerslag

[11] 4,334,819
[45] Jun. 15, 1982

[54] BATTERY CHARGING SYSTEM

[76] Inventor: Julius G. Hammerslag, 27011 Calle Esperanza, San Juan Capistrano, Calif. 92675

[21] Appl. No.: 134,648

[22] Filed: Mar. 27, 1980

[51] Int. Cl.³ .............................................. B65G 67/02
[52] U.S. Cl. ...................................... 414/395; 104/34; 198/482; 414/399
[58] Field of Search ............... 414/373, 390, 391, 392, 414/395, 399, 400; 104/34; 320/2; 198/482, 476

[56] References Cited

U.S. PATENT DOCUMENTS

| | | | |
|---|---|---|---|
| 417,259 | 12/1889 | Main | 104/34 |
| 434,579 | 8/1890 | Corning | 104/34 |
| 682,175 | 9/1901 | Condict | 104/34 X |
| 1,335,243 | 3/1920 | Klingelsmith | 104/34 X |
| 3,664,483 | 5/1972 | Revaz | 198/476 X |
| 3,675,108 | 7/1972 | Nicholl | 320/2 |
| 4,055,260 | 10/1977 | Tamas | 104/34 X |
| 4,173,426 | 11/1979 | Schell | 198/482 X |
| 4,227,463 | 10/1980 | Pfleger | 104/34 |

*Primary Examiner*—James L. Rowland
*Attorney, Agent, or Firm*—Newton H. Lee, Jr.

[57] ABSTRACT

A battery charging system for battery-powered vehicles has a battery transfer station, at which a vehicle is positioned for removal and replacement of the spent and charged battery. The spent battery is removed from the vehicle and transferred to a charging system, and a charged battery is transferred from the charging system to the vehicle. In one form, the batteries are conveyed through a continuous charging system, upon removal from the vehicle, and a fully charged battery is deposited in the vehicle. In another form, batteries are transferred from and to the vehicle by a battery transfer system which transfers the batteries to and from storage and charging bays. In all cases, the discharged battery is removed from the vehicle, and a charged battery is installed in the vehicle.

6 Claims, 11 Drawing Figures

BATTERY CHARGING SYSTEM

BACKGROUND OF THE INVENTION

In the operation of battery-powered, electric vehicles, it has been the practice to install in the vehicle a typical electric battery which is capable of providing electromotive force for a period of time. When the battery becomes discharged, the battery can be replaced, with substantial effort, or the vehicle can be stored, for a period of time, in a location having a battery charger system connectable to the vehicle battery.

Battery-powered, electric vehicles have a limited range of operability, say 50 to 100 miles on a fully charged battery or battery bank. Plugging into a battery charging system is time consuming, but in general this has been the only recourse, because there has been no facility for rapid and easy exchange of a discharged battery for a fully charged battery.

The necessity of charging a battery or battery system at frequent intervals has been a detrimental factor in the development of a practical electric car system, which requires, in addition to simple battery operation, a simple and efficient mode for exchange of a spent battery for a fully charged battery, in an expeditious and facile manner, in a short period of time.

SUMMARY OF THE INVENTION

The present invention provides a battery charging and exchange system for electric vehicles which satisfies the above problems in a simple and efficient manner.

The present invention enables battery transfer or exchange stations to be located at intervals enabling short to long range usage of the vehicle. To accomplish this objective, the vehicle is equipped with a battery of standard shape and construction, to be easily interchangeable. Such an arrangement enables the exchange of batteries in a rapid manner requiring little, if any, physical involvement of the vehicle operator. More particularly, the invention contemplates a system which:

1. Positions the vehicle at a battery transfer system;
2. Provides for removal of the spent battery;
3. Transfers to the vehicle a fully charged battery; and
4. Charges the spent batteries in a manner affording an available supply of transferrable, charged batteries.

Since, in a battery charging and transfer system as contemplated by the invention, a number of batteries, in a charged state, must be available at all times, the invention involves a charging system for the batteries wherein a plurality of batteries can be charged and interchanged with spent batteries.

The batteries may be charged in a continuous conveyor and charging system, or the batteries may be manipulated between charging stations and the vehicle, by means of battery transport mechanisms.

Thus, in one form illustrated herein, the battery charging system is incorporated in a continuous conveyor apparatus, having a transfer station, at which a spent battery is removed from the vehicle and a charged battery is installed in the vehicle, while spent batteries travel in an endless conveyor system through a battery charging station of a suitable length. Also, in another form, the spent battery is removed from the vehicle and transferred to a specific charging station by a transfer mechanism, and a charged battery installed in the vehicle. In either case, the time requirement is minimized.

Accordingly, an object of the invention is to provide a battery storage system which enables the rapid interchange of a spent battery with a fully charged battery, without requiring in-vehicle battery charging and consequential loss of time, whereby a number of battery charging and transfer stations can be strategically located to permit long range electric vehicle operation over incremental distances, without significant loss of time at the charging stations.

For example, in the use of battery-powered vehicles, the safe operating range for an excursion may be one hundred miles, i.e., a fifty mile round trip. With strategically located battery exchange stations, the range, with quick change of batteries, can be unlimited.

This invention has other advantages and features which will best be understood by reference to the two examples disclosed herein, but it is to be understood that the following detailed description and the accompanying drawings are not to be taken in a limiting sense. The invention is defined in the appended claims.

DESCRIPTION OF THE PREFERRED EMBODIMENTS

As seen in the drawings, referring first to FIGS. 1 through 6, a vehicle V is located at a transfer station T of a battery storage and charging facility. At the transfer station, the battery for the vehicle is removed (FIG. 2) and a fully charged battery is installed in the vehicle (FIG. 3), without requiring manual manipulation or the making or breaking of electrical connections. A battery removed from the vehicle by a manipulator M is transferred to an endless conveyor system C adapted to transport the battery through a charging system, and a fully charged battery leaving the charging system is deposited in the vehicle by the manipulator M.

Figure 1:
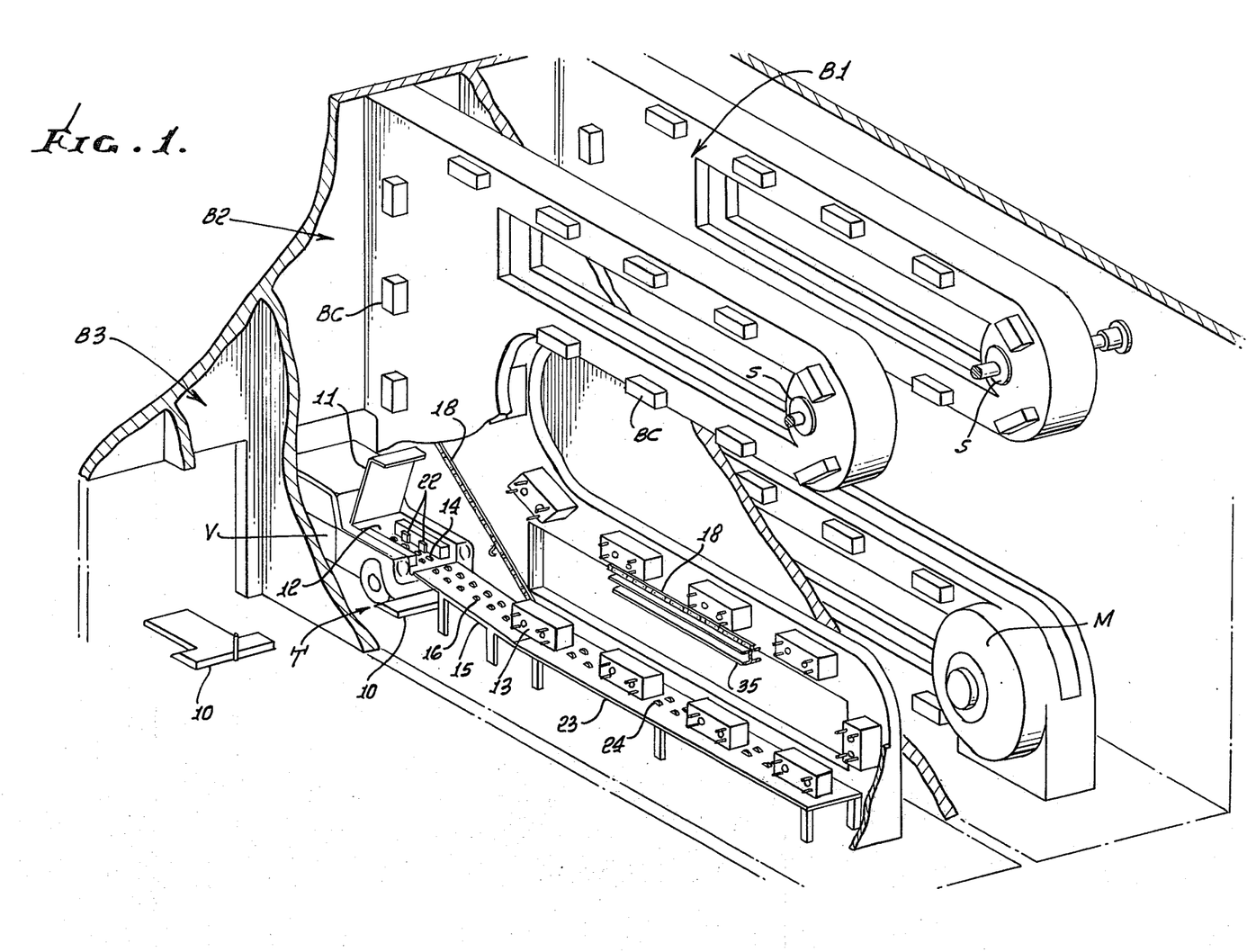
FIG. 1 is a fragmentary perspective, with parts broken away showing what is presently deemed the preferred battery charging system, wherein batteries are transferred from and to the vehicle in an endless charging system.

The vehicle is driven into a transfer station and accurately positioned by engagement of the front wheels with a stop 10, which may be raised or indented, to limit forward motion of the vehicle. At this station, the vehicle operator may activate the system, by card or coin, or an attendant may activate the system. As seen in FIG. 1, the system preferably has plural drive-in bays B1, B2 and B3, portions of which are broken away for illustrative purposes.

The vehicle has a forward hood 11, openable in a manner to expose the battery compartment 12. In FIG. 1, the battery 13 has been removed from the vehicle and transferred to the conveyor system for charging. Such batteries are quite heavy, say 1,000 pounds or more, and, thus, as shown, the vehicle is equipped with rollers 14 on the base of the battery compartment to facilitate movement of the battery, as later described, from the compartment 12 towards the conveyor system C. In addition, an intermediate inclined skid or way 15 having rollers 16 is disposed between the front end of the vehicle and the conveyor, enabling the battery to move by gravity from the rollers 14 to a location in the conveyor system at which the battery can be engaged by hooks of the conveyor chains 18. The chains are arranged as a parallel pair extending in a downwardly inclined run from a location above the front end of the vehicle towards the lower end of the way 15, as will be later described.

Figure 5:
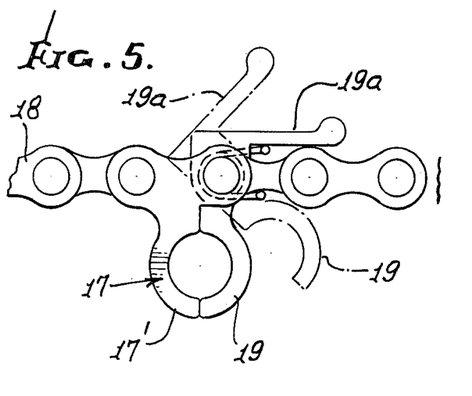
FIG. 5 is a fragmentary detail showing a portion of the conveyor chain and battery engaging hook structure.

Each chain has longitudinally spaced hooks 17, one of which is shown in FIG. 5, having a body 18, forming one chain link and a pivoted bail 19 spring loaded to an open condition. The body and bail have semicircular inner walls enabling engagement with pins 20 which are longitudinally spaced and symetrically arranged at opposite sides of each battery for a purpose later described.

Also, longitudinally spaced at opposite sides of the battery and centrally of the pins 20 are terminals or posts 21 which are contact posts. These posts 21 are adapted to enable ease of installation or removal of a battery from the vehicle. The vehicle is provided, in the battery compartment 12, with contact pads 22 engageable by the posts 21, when the battery is in the compartment, to establish electrical connection between the battery and the motor or motors (not shown) which drive the vehicle. The concept here is that the battery can be moved into the battery compartment 12 and electrical contact between the posts 21 and the pads 22 will be automatically established, without requiring manual connection. Because of the symetrical arrangement of pins 20 and posts 21, the battery is reversible, top to bottom and end to end.

Likewise, as will be later described, the battery can be removed without necessitating manual disconnection, so that, as described above, the battery can move gravitationally to a position for pick-up by the hooks 17 on the chain 18. The chains can then be driven by motors M, being trained over sprockets S for endless travel past the transfer station T. The details of the motors M and sprockets S are not germane to the invention and need no further illustration or description.

Figure 6:
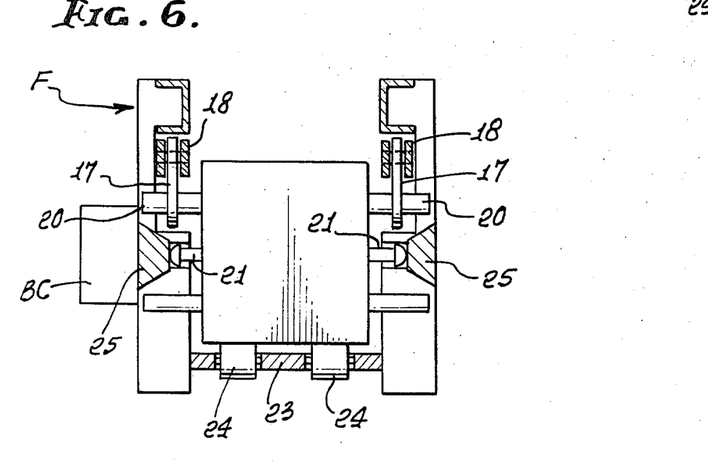
FIG. 6 is a typical section through a charging station, with a battery in position for charging.
Figure 7:
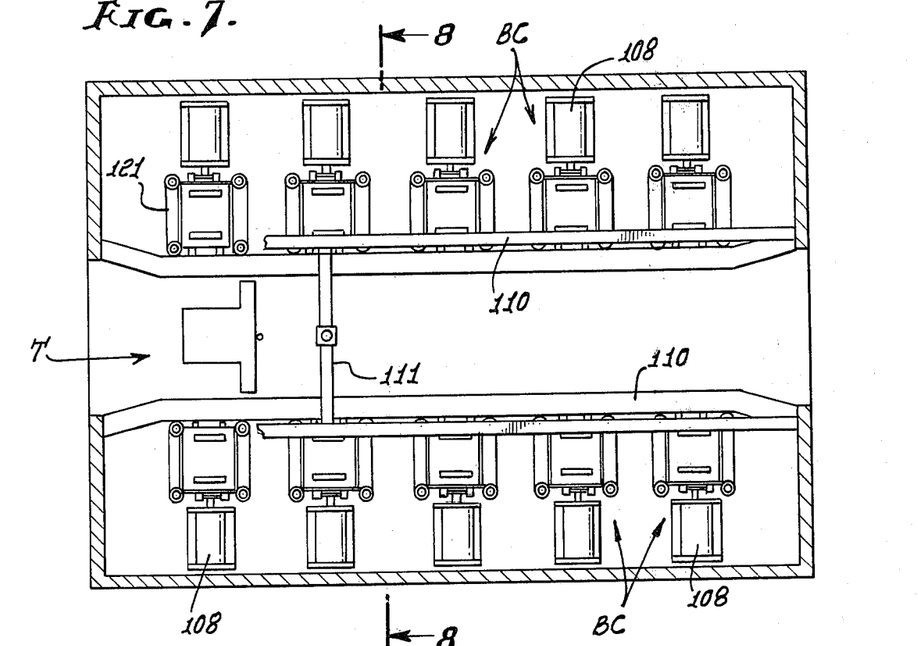
FIG. 7 is a top plan of another charging system, with building walls shown in section.

Charging of the batteries will be accomplished at battery charging stations BC which are spaced along the path of battery travel at increments corresponding to the spacing of the hooks 17 so that when a battery is picked up by the conveyor and moved by the conveyor the successive batteries will be stopped at a charging station, an example of which is shown in FIG. 6.

Without requiring illustration or further description herein, it will be understood that suitable control means may be employed to cause the motors M to drive the conveyor a distance equal to the spacing between the charging units BC, as each battery is removed from a vehicle and fed to the conveyor C.

Referring to FIG. 6, a representative section of the conveyor and charging system is shown. It will be seen that the hooks 17, on the laterally spaced chains 18, engage the manipulator pins 20 to move the battery along a support member or plate 23 having rollers 24, which, like rollers 14 and 16 previously described, support and also facilitate movement of the substantial weight of the battery by the chains 18.

Continuous electrical contact members 25 are installed in the frame structure F for sliding electrical contact with the posts 21 of the battery, whereby the battery can be subjected to a continuous, but controlled charge, by a charging unit, not shown, but of well known construction and function. Since the batteries will be moved in succession through the endless path of the chains 18, at time intervals determined by the demand for a battery transfer at the transfer station, each battery moves progressively to the battery charging stations BC. Such stations BC are provided, as will be understood by those skilled in the art, with voltage regulators adapted to limit the charge impressed on any given battery. Therefore, a fully discharged battery entering the system may be fully charged before needed for installation in a vehicle, but the units BC will preclude overcharging damage to the batteries, but a fully charged battery will be available at the transfer station T, on demand.

The manipulator M may take various forms, but the main purpose is to pick up a battery from the charging system and transfer the charged battery to the vehicle. In the form preferred, with the vehicle and battery adapted for automatic removal and installation of the battery, the manipulator M can displace the spent battery from the vehicle and also transfer a charged battery from the conveyor system.

Figure 2:
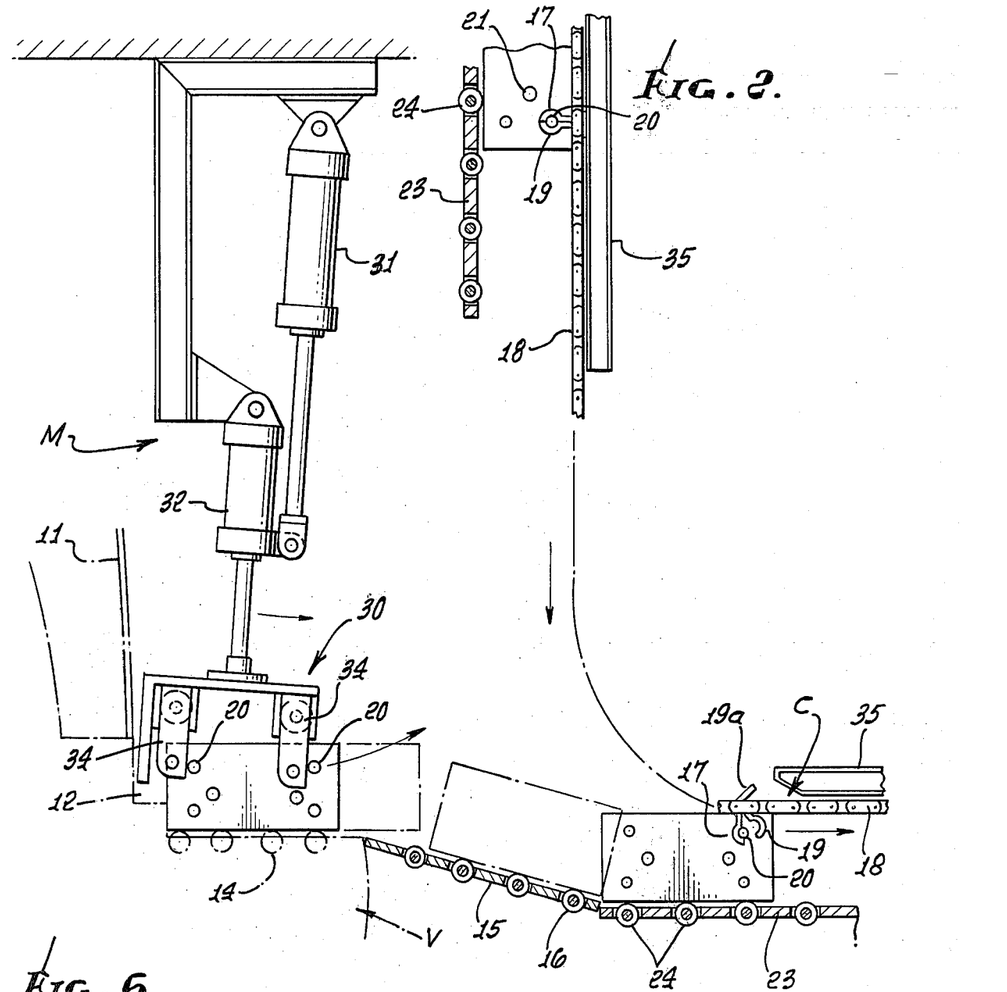
FIG. 2 is an enlarged fragmentary vertical section at the battery transfer station, showing the removal of the vehicle battery from the vehicle.
Figure 3:
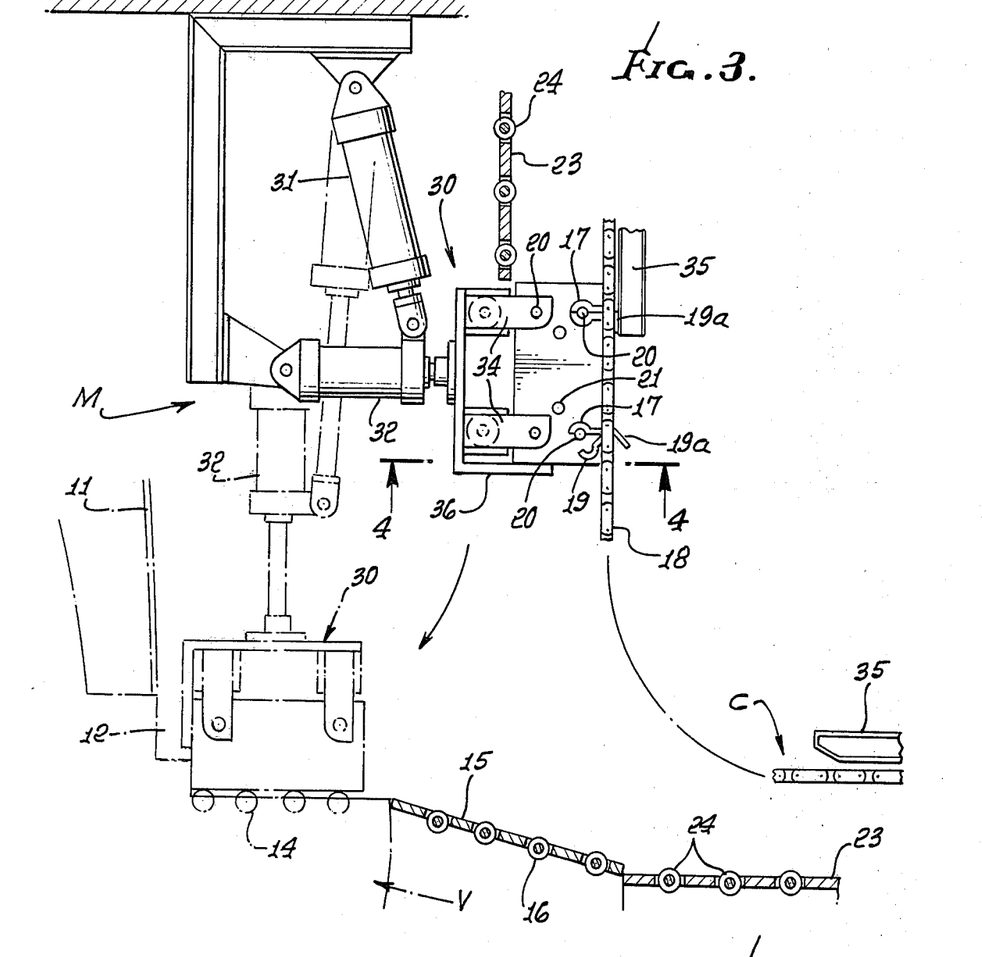
FIG. 3 is a view corresponding with FIG. 2, but showing installation of a charged battery in the vehicle.

As seen in FIGS. 2 and 3, the manipulator M comprises a battery engaging head section 30, a primary ram or actuator 31 and a secondary ram or actuator 32. Hydraulic rams are shown, but other actuators, such as electrical actuators may be employed. In any event, the purpose of the primary and secondary rams is to move the head to the position of FIG. 2 from or to the position of FIG. 3.

Figure 4:
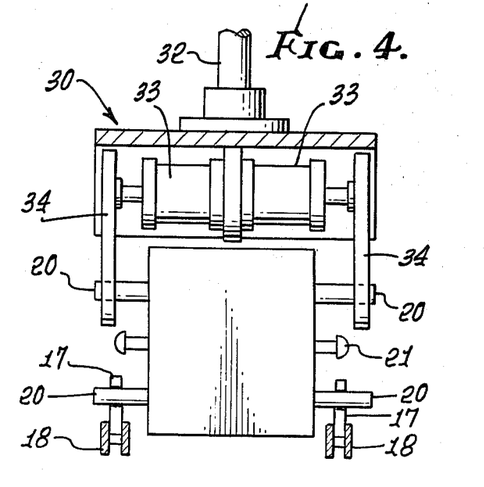
FIG. 4 is an enlarged detail view on the line 4—4 of FIG. 3.

The head 30, as seen in FIG. 4, is operable to engage or be disengaged from the battery pins 20. Double-acting rams, or other actuators 33, are adapted to effect reciprocation of grapples or arms 34 to engage or disengage from the pins 20, as indicated by the arrow.

Head 30 is adapted, in the position of FIG. 2, to engage the battery pins 20 with the arms 34 to push the battery from the vehicle onto the way 15, so that the battery will gravitate to a position, shown in broken lines in FIG. 2, to be engaged by the hooks 17. The inclination of the battery and the arc of the chains are such that a first hook 17 will engage a forward pin 20, causing the battery to be moved forwardly, and then a second hook on the chain will engage the rearward pin 20. The hooks automatically close on the pins 20 when the battery is horizontal on the plate 23 or rollers 24. The pivoted bail 19 of each hook has a locking arm 19a which moves beneath and is closed by a cam surface of a locking rail 35 which extends throughout the conveyor system to prevent opening of the hooks until the charged battery (FIG. 3) is to be picked up by the transfer head 30. The plate 23 also extends throughout the conveyor system, to the position of FIG. 3, so that the battery is, at all times, confined between the channels 35 and the plate 23, until the battery passes downwardly between the expanded grapple arms 34, onto a lower support or seat 36 of the head 30. At this time, rams 33 can be actuated to close the arms 34 on one pair of the pins 20, as seen in FIG. 4.

Then, as seen in broken lines in FIG. 3, ram 31 can be extended to pivot ram 32 downwardly to dispose the battery above the battery compartment in a reversed relation as compared to its relation when removed from a vehicle. At this time, ram 32 can be extended to lower the battery into the battery compartment to engage the posts 21 with contacts 22 of the vehicle. The grapple rams 33 are then opened to release the battery, and rams 32 retracted to position the head 30 in an upper position to await the next vehicle.

From the foregoing, it will now be apparent that the system provides a battery transfer system T for receiving the vehicle, means 30, 31 and 32 operable at the transfer station to remove the battery from the vehicle and transfer a fully charged battery to the vehicle from the conveyor means which moves batteries through the charging stations.

Referring to FIGS. 7 through 11, another system is shown having a transfer station, a plurality of charging stations BC and means for moving the batteries to and from the charging stations and removing and installing batteries from and in the vehicle.

Figure 8:
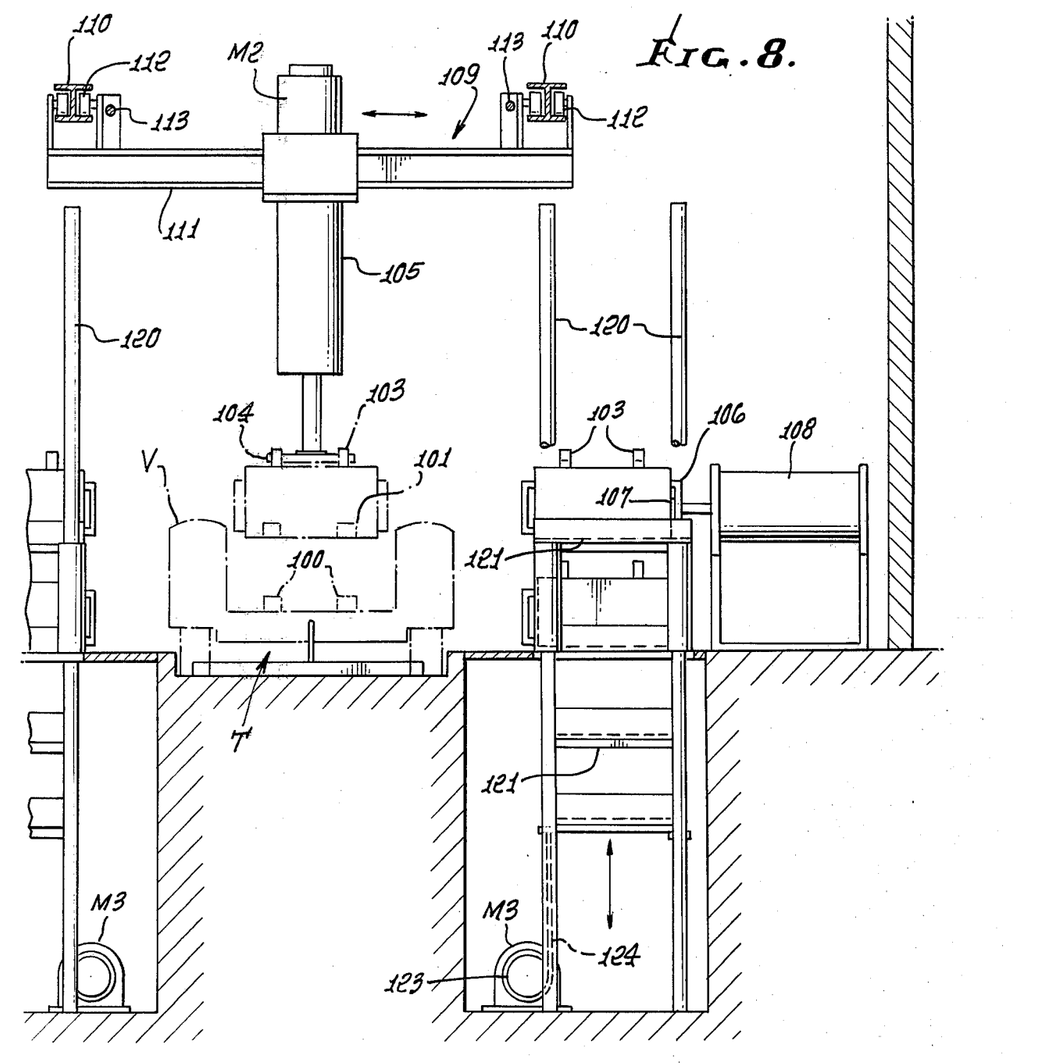
FIG. 8 is an enlarged vertical section on the line 8—8 of FIG. 7, illustrating the transfer station and the installation of a charged battery in the vehicle.
Figure 9:
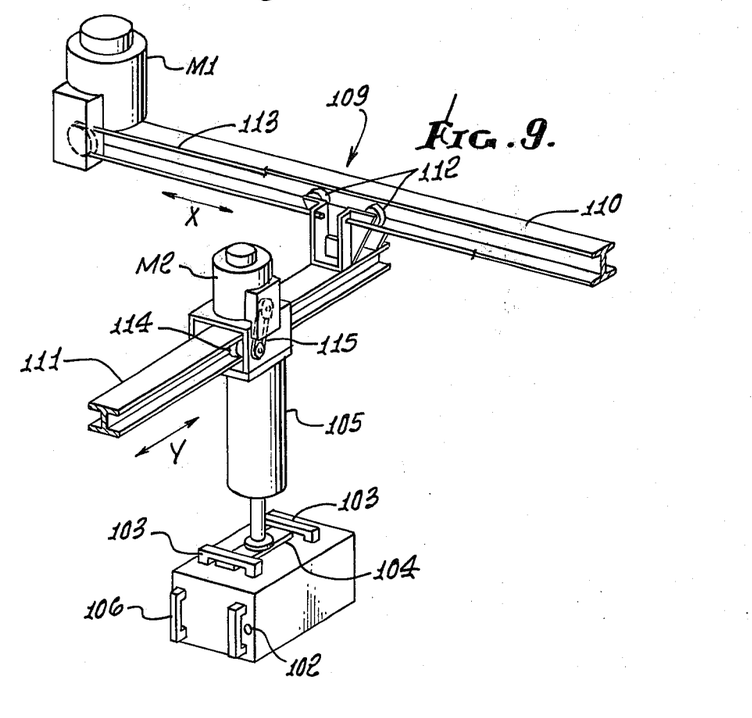
FIG. 9 is a fragmentary perspective showing the travelling crane system.

The batteries in this system are also adapted for automatic connection with and disconnection from the electrical system of the vehicle, say as by means of plugs 100 in the battery compartment of the vehicle and sockets 101 in the battery, as seen in FIG. 8. The batteries also have charging posts 102 at their opposite ends engageable with charging contacts at the charging stations, as will be later described. In order to provide for transfer of the batteries between the vehicle and a selected charging station, the batteries have a pair of top loops or bars 103 spaced apart to receive a companion bar 104 on the rod of a vertical ram 105, providing means for engaging a battery to move it vertically. At opposite ends, the batteries have laterally spaced loops or bars adapted to be engaged by a companion bar 107 at the rod end of one of a plurality of horizontal rams 108 spaced along a number of battery charging stations and providing means to move the battery to and from a charging station.

Ram 105 is supported by means for moving the ram and a battery thereon from the vehicle and to a selected charging station. The moving means, in this form, is shown as a motorized crane 109. This crane is adapted to move the battery in X-Y directions, as indicated by the arrows in FIG. 9. The crane has laterally spaced, elongated beams 110 which straddle the transfer station T and extend above the charging stations. Shiftably carried by the beams 110 is a cross beam 111, supported on rollers 112 engaging the beams 118. A reversible motor M1 is adapted to drive a pulley or sprocket and chain 113 to move the cross beam along the side beams 110 in the opposite X directions. The cross beam 111 supports the ram 105 on suitable rollers 114 engaged with the beam and adapted to be driven by a reversible motor M2 by a suitable sprocket and chain drive 115, to move the battery support ram 105 in the opposite Y directions.

Figure 10:
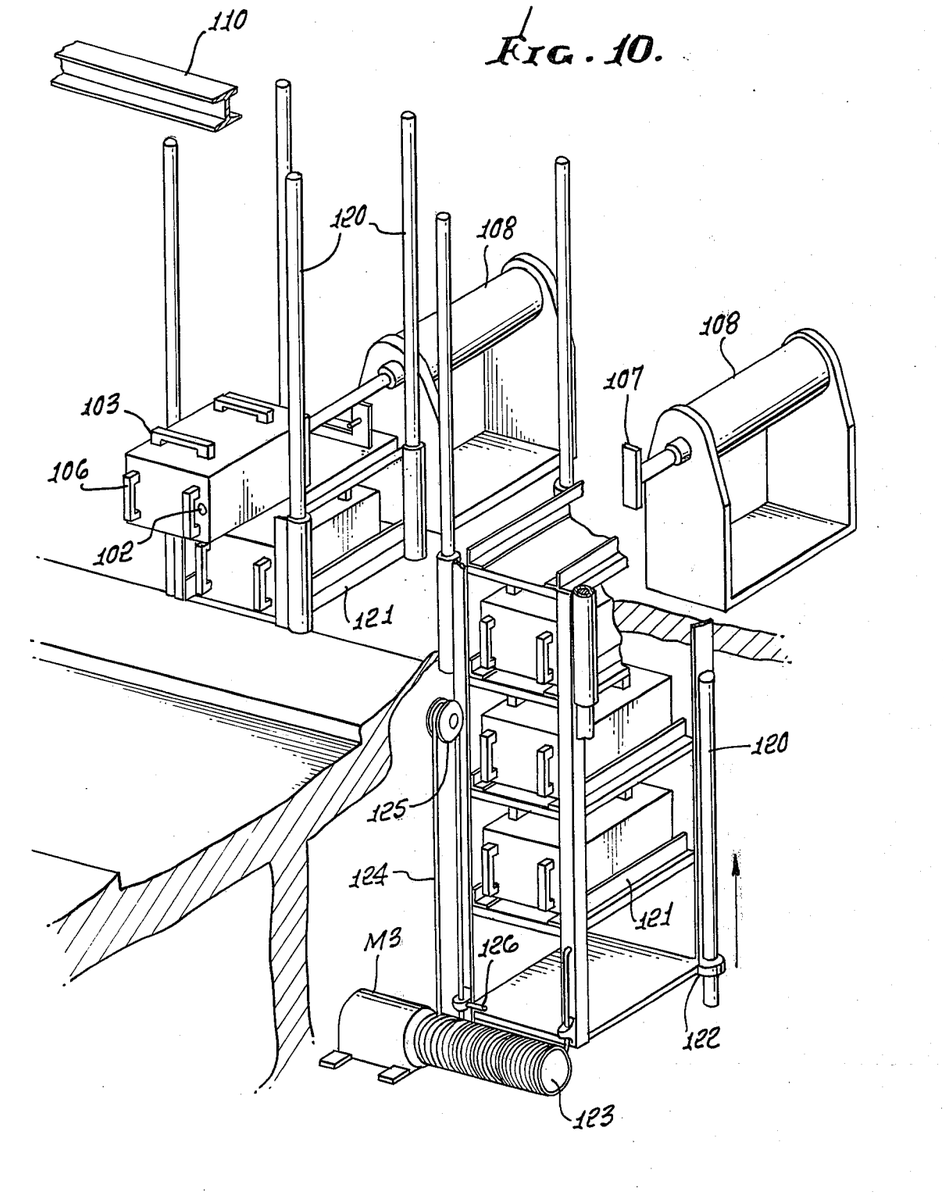
FIG. 10 is a fragmentary perspective showing the charging stations.

Referring to FIGS. 8—11, it will be seen that the charging stations are arranged to accommodate a substantial number of batteries in vertically stacked sets, at opposite sides of the service building. Thus a plurality of vertical guide posts 120, or other vertical guides support for vertical shifting movement a plurality of trays or bins 121. These bins or trays are in a frame structure 122 slidably mounted on the guide posts 121. Means are provided to raise and lower the frame structure 122, herein shown as a hoist motor and brake M3 for driving a cable drum 123 on which is wound a cable 124. The cable extends over an upper pulley 125 and is connected at 126 adjacent to the lower end of the frame to raise and lower the frame, the trays and the batteries to and from a location, as seen in FIG. 10, at which a battery is aligned with one of the horizontal rams 108, or an empty bin is located to receive a spent battery.

Figure 11:
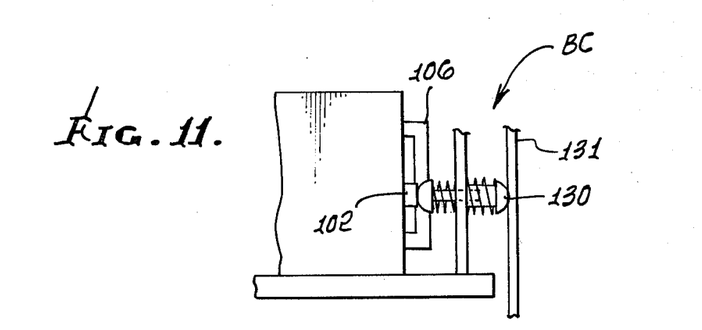
FIG. 11 is a fragmentary detail showing a typical charging station.

Batteries in the bins are charged, under the control of a suitable voltage regulator, not shown, at all levels of the batteries. As seen in FIG. 11, one of the charging posts 102 of the battery in a bin is engaged with a spring loaded, telescopic contact number 131. Then, as the bin is raised or lowered, continuous contact can be maintained between the battery contact and a vertically extended contact strip 131. It will be understood, without need of further illustration, that a pair of such contact strips 131 will be provided at each charging station BC for positive and negative contact with a pair of the battery contacts 102.

In use, a vehicle is presented to a transfer station T with a partially spent battery, at which the ram 105, the crane 109 or other like transfer means, and the battery engaging rams 108 can transfer a spent battery to a charging station BC from the vehicle and transfer a charged battery to the vehicle from a charging station. At this time, the ram 108 can be actuated to engage the battery and move it into a bin of the charging station. Without requiring illustration, it will be understood that the rods of the rams 105 and 108 are rotatable to enable engagement of the T-heads with the loops or bails on the battery, as well as disengagement.

Thereafter, the crane is driven to a battery charging station containing a charged battery and the rams 105 and 108 and the crane operated to transfer the charged battery to the vehicle battery compartment.

From the foregoing it will now be apparent that various controls can be employed for automating the battery charging system for coin or card operation. Also, controls can be employed to automatically position the transfer means at an empty charging station for insertion of a battery as well as at a charging station having a properly charged battery for exchange with a spent battery.

I claim:

1. A battery charging system for electric vehicles comprising: a battery transfer station for receiving a vehicle; means operable at said transfer station to remove a spent battery from the vehicle and for installing a charged battery in said vehicle, means providing a plurality of charging stations; in a continuous path from and to said transfer station and means for moving spent batteries from said battery transfer station through said charging stations and returning charged batteries to said transfer stations; including an endless conveyor connectable to said batteries, and extending along said path, said charging stations being spaced along the path of said endless conveyor, said conveyor having means to engage and transport the batteries through said path.

2. A battery charging system as defined in claim 1, said means for moving batteries being an endless conveyor connectable to said batteries, said charging stations being spaced along the path of said endless conveyor.

3. A battery charging system as defined in claim 1, said means operable to remove and install a battery including a receiver for a battery and a grapple to support the battery when disconnected from said conveyor, and shifting means to move the grapple to the vehicle.

4. A battery charging system as defined in claim 1, said conveyor having means to automatically connect the spent battery to the conveyor responsive to movement of the conveyor past the battery.

5. A battery charging system as defined in claim 1, said conveyor having means to automatically connect the spent battery to the conveyor responsive to movement of the conveyor past the battery, said means operable to remove and install a battery including a receiver for a battery and a grapple to support the battery when disconnected from said conveyor, and shifting means to move the grapple to the vehicle.

6. A charging system for the battery of electric vehicles comprising, in combination, a vehicle having a battery compartment, a battery in said compartment having symetrically arranged pairs of manipulator pins on each lateral side adjacent to its top and bottom, and centrally located contact posts, said compartment having contacts engageable with said posts, an endless conveyor having manipulator pin engaging means to engage one pair of pins and carry a battery on said conveyor, a battery transfer station to receive the vehicle, battery transfer means at said transfer station means to shift a spent battery from said compartment to said conveyor for engagement of one pair of pins by said manipulator pin engaging means, and battery transfer means at said transfer station to engage the other pair of pins and move a battery from said conveyor to said compartment.

* * * * *